(No Model.)
E. C. STORROW.
COMPOUND PIPE.
No. 562,205. Patented June 16, 1896.
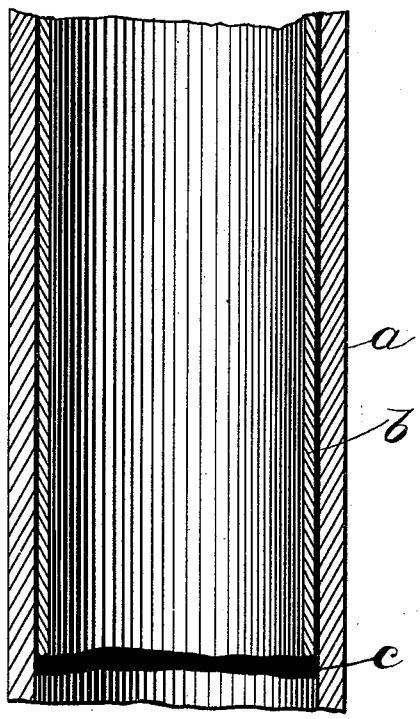
WITNESSES
Charles T. Crocker.
F. H. Davis
INVENTOR
Edward C. Storrow
by D. Hayes,
atty.

UNITED STATES PATENT OFFICE.

EDWARD C. STORROW, OF BOSTON, MASSACHUSETTS.

COMPOUND PIPE.

SPECIFICATION forming part of Letters Patent No. 562,205, dated June 16, 1896.

Application filed June 14, 1895. Serial No. 552,779. (No model.)

*To all whom it may concern:*

Be it known that I, EDWARD C. STORROW, of Boston, county of Suffolk, State of Massachusetts, have invented an Improvement in Compound Pipes, of which the following description, in connection with the accompanying drawing, is a specification, like letters on the drawing representing like parts.

This invention has for its object to construct a compound pipe which may be used for conveying water, as well as put to other uses; and it consists, essentially, of an external iron pipe and a lead core-pipe.

As is well known, great trouble has been experienced in securing a lead or equivalent core-pipe within an iron pipe, holding it in place under the many different conditions to which it is subjected, owing to the great differences in expansion between the two metals, the lead core-pipe expanding more than twice as much as the iron pipe, and this difficulty is particularly apparent when storing and shipping the compound pipe, as, for instance, it may be kept for a considerable length of time at a temperature below freezing, or may be placed in the sun and thereby subjected to a radically-different temperature.

My invention comprehends the employment of a flexible elastic interposed adherent between the two pipes of a specific kind or character.

I place upon or around the lead core-pipe a layer of rubber in its natural state, which may be more or less adulterated with materials well known in the art if desired, then introduce the core-pipe thus coated into the iron pipe, then expand the core-pipe as by drawing a mandrel through it, and lastly subject the compound pipe thus constructed to a sufficient heat to vulcanize the rubber which has been interposed between the two pipes. Instead, however, of coating the core-pipe with rubber before it is introduced into the iron pipe, it may be first introduced, and then rubber in any suitable soluble or liquid form poured between the two pipes, and afterward vulcanized. I find in practice that the process of vulcanization causes the rubber to adhere firmly to the pipes, thereby joining them together. The interposed material treated in this manner is caused to adhere to the pipes, firmly securing the two pipes together, yet permitting them to expand and contract independently at their different respective ratios, and its condition when subjected to ordinary high or low temperatures, even temperatures far below freezing, is not liable to change.

The drawing shows a longitudinal section of a compound pipe embodying this invention, provided with an interposed layer of rubber, vulcanized after it has been introduced.

*a* represents the external iron pipe, *b* the lead core-pipe, and *c* a layer of rubber. As before stated, this rubber is applied to the core-pipe in its natural state, more or less adulterated for cheapness, and after the core-pipe thus coated has been introduced into the iron pipe it is expanded by a mandrel or otherwise, and then the compound pipe, thus constructed, is subjected to a sufficient heat to vulcanize the rubber, thereby causing it to firmly adhere to the metal pipe; or if desired the rubber in suitable soluble or liquid form may be poured between the core-pipe and iron pipe, after which it is vulcanized, or the rubber film may be otherwise introduced between the two pipes and thereafter vulcanized.

My invention is applicable to pipe-fittings, unions, &c., connecting sections of pipe together, and these therefore are herein included.

I do not herein claim a pipe, fitting, or union composed of a shell, a lining, and an interposed layer of flexible adhesive compound, as the same is not my invention.

I claim—

As a new article of manufacture a compound pipe, pipe-fitting, or union, composed of an iron shell *a*, lead core-pipe *b*, interposed layer of rubber *c* vulcanized between the two pipes, and adhering thereto by vulcanization.

In testimony whereof I have signed my name to this specification in the presence of two subscribing witnesses.

EDWARD C. STORROW.

Witnesses:
B. J. NOYES,
C. B. CROCKER.